(12) United States Patent
Rivera

(10) Patent No.: US 12,127,703 B2
(45) Date of Patent: *Oct. 29, 2024

(54) LIQUID INFUSION DEVICE

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 263 days.

This patent is subject to a terminal disclaimer.

(21) Appl. No.: 17/008,498

(22) Filed: Aug. 31, 2020

(65) Prior Publication Data

US 2022/0061579 A1    Mar. 3, 2022

(51) Int. Cl.
| | | |
|---|---|---|
| *A47J 31/20* | (2006.01) | |
| *A47J 31/00* | (2006.01) | |
| *A47J 31/06* | (2006.01) | |
| *A47J 31/44* | (2006.01) | |

(52) U.S. Cl.
CPC .............. *A47J 31/20* (2013.01); *A47J 31/005* (2013.01); *A47J 31/0626* (2013.01); *A47J 31/0636* (2013.01); *A47J 31/4407* (2013.01)

(58) Field of Classification Search
CPC ...... A47J 31/005; A47J 31/0626; A47J 31/18; A47J 31/20; A47J 31/0636
USPC .................................................... 99/322, 323
See application file for complete search history.

(56) References Cited

U.S. PATENT DOCUMENTS

| | | | |
|---|---|---|---|
| 523,344 A * | 7/1894 | Hancock ................. | A47J 31/20 99/279 |
| 545,936 A * | 9/1895 | Bentall .................... | A47J 31/20 |
| 1,648,983 A | 11/1927 | Elrod | |
| 1,887,848 A | 11/1932 | Peirce | |
| 1,984,047 A | 12/1934 | Thieme | |
| 2,858,762 A | 11/1958 | Wade | |
| 5,265,517 A | 11/1993 | Gilbert | |
| 5,453,189 A * | 9/1995 | Joergensen ............. | A47J 31/20 441/89 |
| 5,472,719 A | 12/1995 | Favre | |
| 5,957,035 A | 9/1999 | Richter | |
| 6,272,974 B1 | 8/2001 | Pascotti et al. | |
| 7,322,274 B2 | 1/2008 | Wang | |
| 7,353,751 B2 | 4/2008 | Takizawa | |
| 7,895,939 B2 * | 3/2011 | Pan ......................... | A47J 31/20 99/322 |
| 8,857,317 B2 | 10/2014 | Manser et al. | |
| 9,713,399 B2 * | 7/2017 | Boone ................... | A47J 43/046 |
| 10,575,672 B2 | 3/2020 | Rivera | |

(Continued)

FOREIGN PATENT DOCUMENTS

| | | |
|---|---|---|
| CN | 103356068 A | 10/2013 |
| DE | 4302899 A1 | 3/1994 |

(Continued)

*Primary Examiner* — Reginald Alexander
(74) *Attorney, Agent, or Firm* — IP Strategies

(57) ABSTRACT

A liquid infusion device includes a container, a container collar, a lid assembly, and a filter basket. The container has an open top, a closed sidewall, and a closed bottom. The container collar has a collar opening and is configured to couple to a rim of the open top. The lid assembly is configured to cover at least a portion of the collar opening. The filter basket is configured to hold infusion material and to be suspended from the lid assembly and into an interior of the container. The filter basket includes an open top, a bottom, and a sidewall having an opening. The infusion device can include a motor configured to impart motion to the filter basket.

31 Claims, 30 Drawing Sheets

(56) References Cited

U.S. PATENT DOCUMENTS

| | | |
|---|---|---|
| 11,064,836 B2 | 7/2021 | Rivera |
| 11,627,827 B2 | 4/2023 | Rivera |
| 2006/0158958 A1 | 7/2006 | Romanik |
| 2007/0056447 A1 | 3/2007 | Swartz et al. |
| 2007/0079708 A1 | 4/2007 | Li |
| 2009/0280219 A1 | 11/2009 | Yoakim et al. |
| 2010/0263549 A1 | 10/2010 | Lee |
| 2013/0118358 A1* | 5/2013 | Lown ............... A47J 31/20 99/279 |
| 2014/0202338 A1 | 7/2014 | Remo et al. |
| 2015/0099045 A1 | 4/2015 | Perentes et al. |
| 2015/0157049 A1 | 6/2015 | Fogelin et al. |
| 2015/0327718 A1 | 11/2015 | Burrows |
| 2016/0367072 A1 | 12/2016 | Boone et al. |
| 2017/0332824 A1 | 11/2017 | Ballezzi |
| 2018/0242775 A1 | 8/2018 | Lin |
| 2019/0059412 A1 | 2/2019 | Jacobs |
| 2019/0059634 A1 | 2/2019 | Jacobs |
| 2019/0374067 A1 | 12/2019 | Duffy et al. |
| 2021/0030193 A1 | 2/2021 | Rivera |
| 2021/0235918 A1 | 8/2021 | Chen et al. |

FOREIGN PATENT DOCUMENTS

| | | | |
|---|---|---|---|
| DE | 202017105060 U1 * | 11/2017 | ............ A47J 31/20 |
| EP | 2119383 A1 | 11/2009 | |
| EP | 2133008 A1 | 12/2009 | |
| WO | 2013160269 A1 | 10/2013 | |

* cited by examiner

LIQUID INFUSION DEVICE

CROSS-REFERENCE TO RELATED APPLICATIONS

This is related to U.S. patent application Ser. No. 16/669,142, which was filed on Oct. 30, 2019, which in turn is a continuation-in-part of co-pending U.S. patent application Ser. No. 15/702,727, which was filed on Sep. 12, 2017, the entire disclosures of which are incorporated herein by this reference.

FIELD OF THE INVENTION

The present invention relates to fluids that are infused with a substance to add flavor or other attributes, and in particular to a device for infusing the substance into the fluid, having an filter basket that rotates or otherwise agitates during the infusion process.

BACKGROUND OF THE INVENTION

Different fluids are commonly infused with other substances in order to add a particular attribute to the fluid. As a common example, several types of beverages, such as coffee, tea, and herbal drinks, are brewed by infusing or steeping ground or shredded beverage material in water or other liquid, which can be hot or cold. Fruits can also be submerged in water, still or effervescent, to impart the fruit flavor and nutrition to the water. Herbs can be used in more concentrated form to produce a tonic or tincture. Other substances such as peppermint leaves, ginger, or bergamot can be used as a flavoring agent for a beverage, or to provide a health benefit, such as to aid digestion. Spirits can also be infused with substances to provide flavor or other attributes. For example, fruit can be infused in vodka to provide a flavored base alcohol for drinking, and ginseng root can be infused in grain alcohol to provide a health tonic. Additives can be infused beneficially in other fluids such as oils, to be used in salad dressings or other purposes such as massage or aromatherapy treatment.

In general, one or more additives, such as fruit and/or herbs, are submerged in a fluid, such as water, alcohol, or oil, which acts as a solvent to draw out attributes of the additive and infuse those attributes into the fluid. The fluid is then imbued with the attributes of the additive. The attributes can include a flavor, a nutritional aspect, and/or a digestive benefit. Of course, well-known drinks such as tea and coffee are infusions, and like any infusion can be made using either hot or cold water or other liquid.

For quick of certain beverages, such as coffee, tea, and herbal drinks, brewed by infusing or steeping ground or shredded infusion material in water, hot water is typically used. However, steeping of the infusion material in cold or room-temperature water rather than in hot water is sometimes preferred. For example, some coffee drinkers prefer the flavor provided by cold infusion, and bitterness and acidity can be avoided when infusion certain teas by steeping in unheated water rather than hot water. Such cold infusion is accomplished by submerging a portion of infusion material in unheated water for a period of time to allow the infusion material to infuse the water. Likewise, infusion of fruit essence and other substances is often preferred in unheated water so as not to alter the character of the infusion by heating. Further, most oils have heating points above which the oil becomes rancid, and therefore infusion at room temperature is preferable. While the unheated steeping process may provide a desired result, the time required for cold infusion is longer than that required for steeping in hot water.

Conventional unheated infusions require a user to submerge an amount of infusion material into the steep liquid. A measured container for a drop-in portion of infusion material would be convenient, particularly for use in an infuser that simplifies removal of the infusion material and clean-up of the device. A device that can be used for both heated and unheated infusion would provide flexibility, and it would be advantageous if the device would be configured to speed the unheated infusion process. The ability for the device to be adaptable to use loose beverage infusion material or pre-packaged infusion material in a capsule or other container, as an alternative to the infusion container, would make such a device universally useful.

It would also be advantageous to provide a feature by which the infusion time is reduced for unheated infusion. Adding an agitation or rotation feature to the device can reduce the unheated infusion time. Another manner of speeding the process would be to increase the flow of infusion liquid through the infusion material. It is possible to use a gravity feed to draw water through the infusion material using a percolator-type action, which would speed infusion time somewhat. However, if such a system were to have a motorized system outside the infusion container to provide the gravity action, the resulting device would have a large footprint that would take up considerable counter space. Also, the complexity of such a system would make it difficult to clean properly and would expose users to potential build-up of bacteria and other contaminants that could affect the taste of the beverage and the health of the user. A system could use a separate container to store and provide the water to be used in the infusion process, but this would add size and complexity to the device.

Therefore, a reliable, rapid infusion device that uses a moving filter basket to increase the fluid flow would provide an overall improved infusion experience. It would also be advantageous if such a device could be configured as a compact unit, preferably a unit that could be portable. Flexibility would be provided if the infusion system can also be used to hot-brew a beverage. Such a system that uses the infusion and serving vessel as the source of the fluid used in the infusion process would make the unit more compact and simple to use and clean.

BRIEF SUMMARY OF THE INVENTION

According to an aspect of the invention, a liquid infusion device includes a container, a container collar, a lid assembly, and a filter basket. The container has an open top, a closed sidewall, and a closed bottom. The container collar has a collar opening and is configured to couple to a rim of the open top. The lid assembly is configured to cover at least a portion of the collar opening. The filter basket is configured to hold infusion material and to be suspended from the lid assembly and into an interior of the container. The filter basket includes an open top, a bottom, and a sidewall having an opening.

The lid assembly can be, for example, a pouring lid assembly, which can include a pouring lid and a filter basket connector. The pouring lid can be configured to cover at least a portion of the collar opening. The filter basket connector can be coupled to the pouring lid and configured to couple to the open top of the filter basket. The filter basket can include first cooperative elements, and the filter basket connector can include second cooperative elements configured to align and engage the first cooperative elements to mechanically couple the filter basket connector to the filter basket. For example, the first cooperative elements can include projections, and the second cooperative elements can include corresponding spaced bars configured to align and engage the projections to mechanically couple the filter basket connector to the filter basket. The projections can be, for example, generally triangular in shape. The pouring lid assembly can also include a handle coupled to the pouring lid opposite the filter basket connector. The pouring lid can have a central through-opening, configured such that the open top of the filter basket opens into the collar opening through the central through-opening when the filter basket connector is coupled to the open top of the filter basket. The filter basket can include basket clips arranged on an outside surface of the filter basket sidewall and configured to removably couple to the filter basket connector.

Alternatively, the lid assembly can be an agitator lid assembly, which can include a chassis assembly and a filter coupler. The chassis assembly can have a through-hole and can be configured to cover at least a portion of the collar opening. The filter coupler can be arranged at an opening in the through-hole of the chassis assembly and configured to couple to the open top of the filter basket. The agitator lid assembly can also include a motor assembly mounted on the chassis assembly. The motor assembly can include a drive element, and a motor configured to selectively impart motion to the drive element. The agitator lid assembly can also include a motor coupler, coupled to the drive element and to the filter coupler, configured to transfer motion of the drive element to the filter coupler. For example, the motor can be configured to rotate the drive element such that the filter coupler rotates. The agitator lid assembly can also include a motor cover, configured to be movably coupled to the chassis assembly to selectively cover and uncover the motor. The filter basket can include first cooperative elements, and the filter coupler can include second cooperative elements configured to align and engage the first cooperative elements to mechanically couple the filter coupler to the filter basket. For example, the first cooperative elements can include projections, and the second cooperative elements can include corresponding spaced bars configured to align and engage the projections to mechanically couple the filter coupler to the filter basket. The projections can be, for example, generally triangular in shape. The filter basket can include basket clips arranged on an outside surface of the filter basket sidewall and configured to removably couple to the filter coupler.

The container collar can include a handle.

The bottom of the filter basket can have a closed surface. Alternatively, the bottom of the filter basket can have a surface including an aperture. The bottom of the filter basket can be a bottom cap configured to be removably coupled to a bottom of the sidewall of the filter basket.

The filter basket sidewall can have a circular cross-section and can include a frame having longitudinal members and connecting circumferential members defining the sidewall opening and a plurality of additional sidewall openings. The filter basket can include a blade projecting inward from an inner surface of the sidewall within an interior of the filter basket. The filter basket can also include a mesh element covering the opening in the sidewall of the filter basket.

According to another aspect of the invention, a liquid infusion device includes container means for holding liquid, having an open top, a closed sidewall, and a closed bottom; collar means having a collar opening, for coupling to a rim of the open top of the container means; covering means for covering at least a portion of the collar opening; and filter basket means for holding infusion material and for being suspended from the covering means and into an interior of the container means. The filter basket means includes an open top, a bottom, and a sidewall having an opening.

BRIEF DESCRIPTION OF THE DRAWINGS

Corresponding reference characters indicate corresponding components throughout the drawings.

DETAILED DESCRIPTION OF THE INVENTION

Figure 1A:
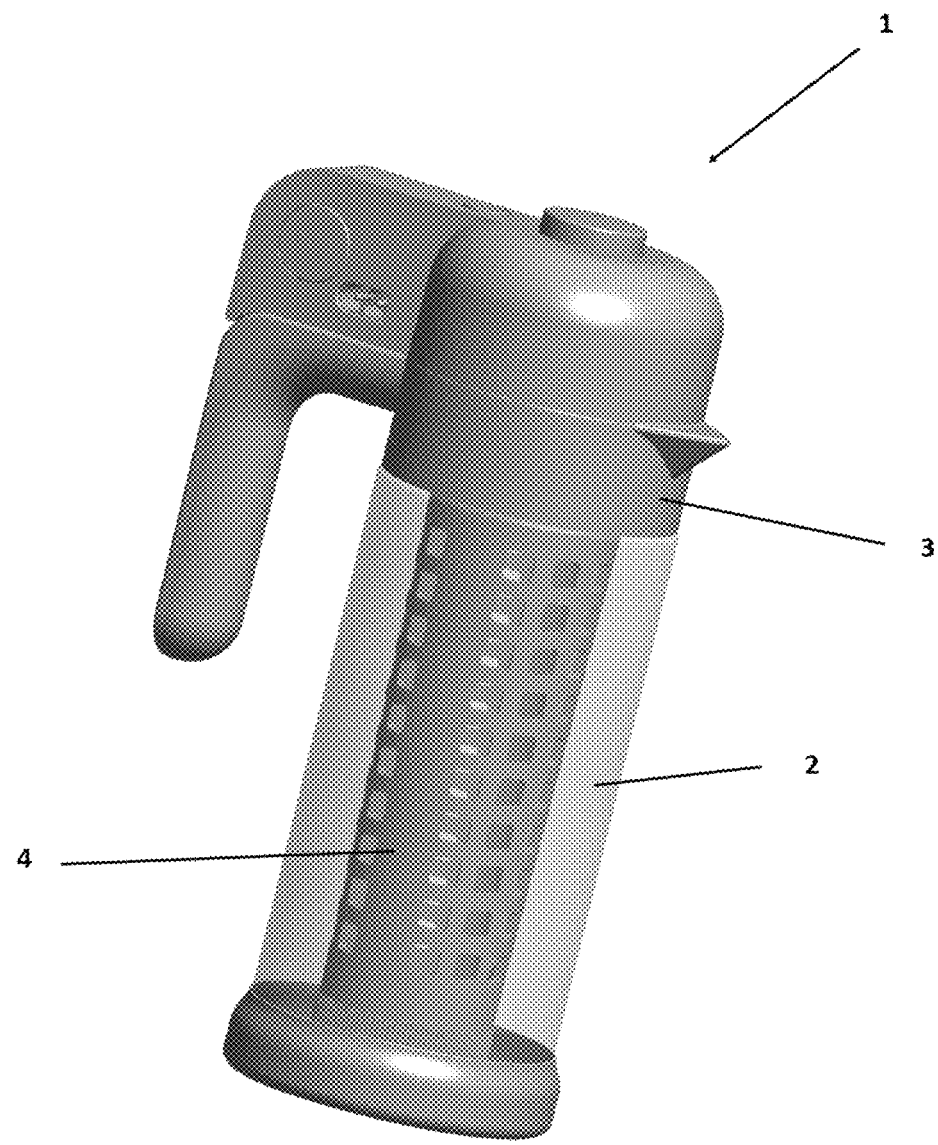
FIG. 1A shows an exemplary liquid infusion device according to the invention.
Figure 1B:
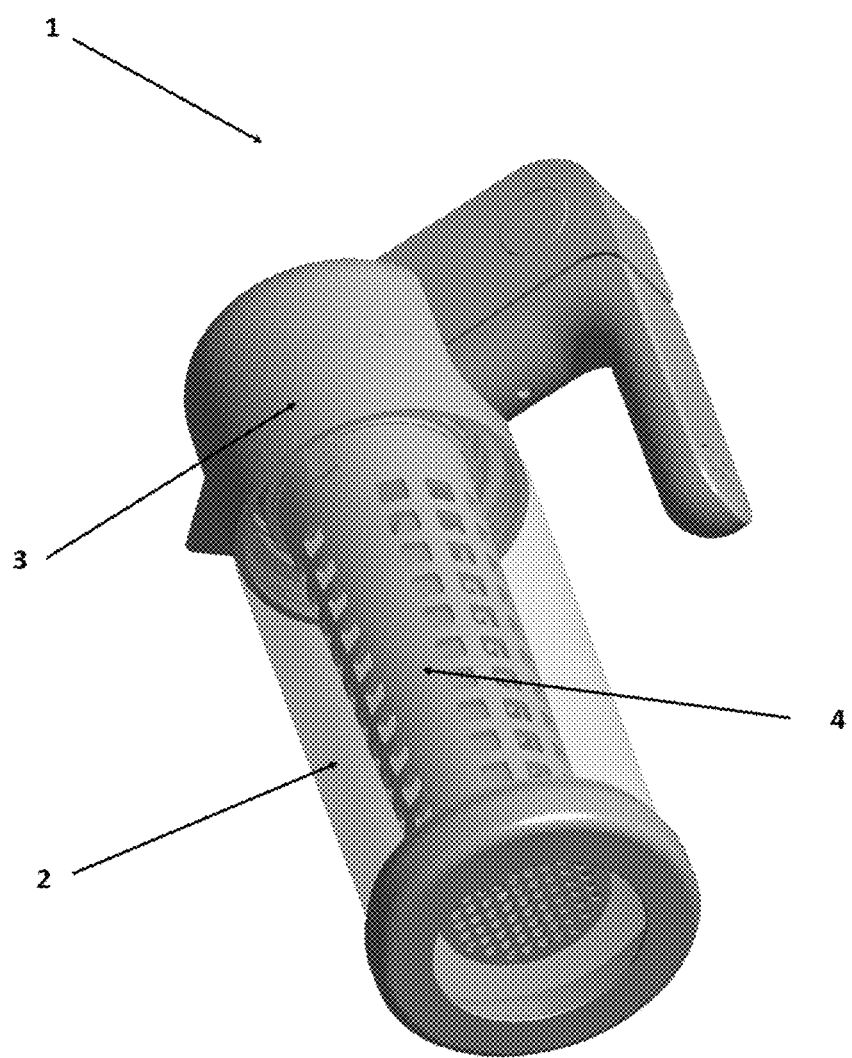
FIG. 1B shows an exemplary liquid infusion device according to the invention.

Referring to FIGS. 1A and B, a liquid infusion device 1 includes a container 2, a container collar 3, and a filter basket 4.

Figure 2A:
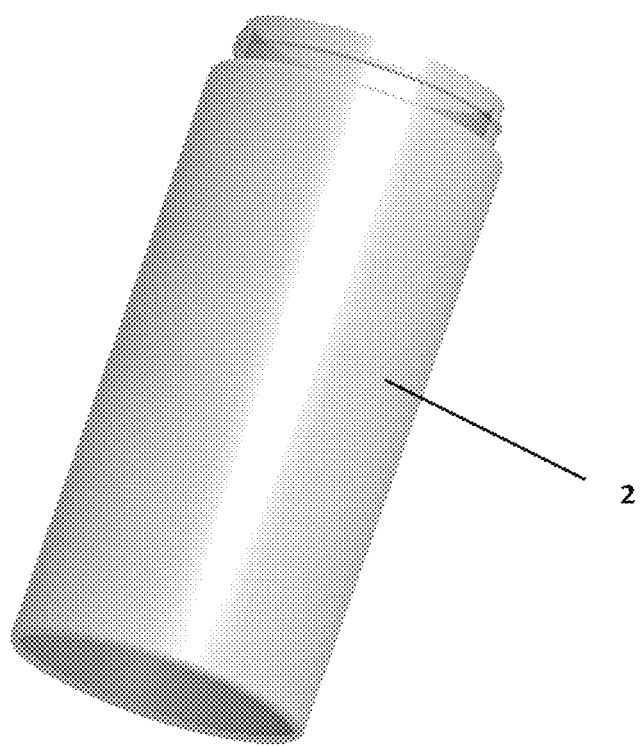
FIG. 2A shows an exemplary container according to the invention.
Figure 2B:
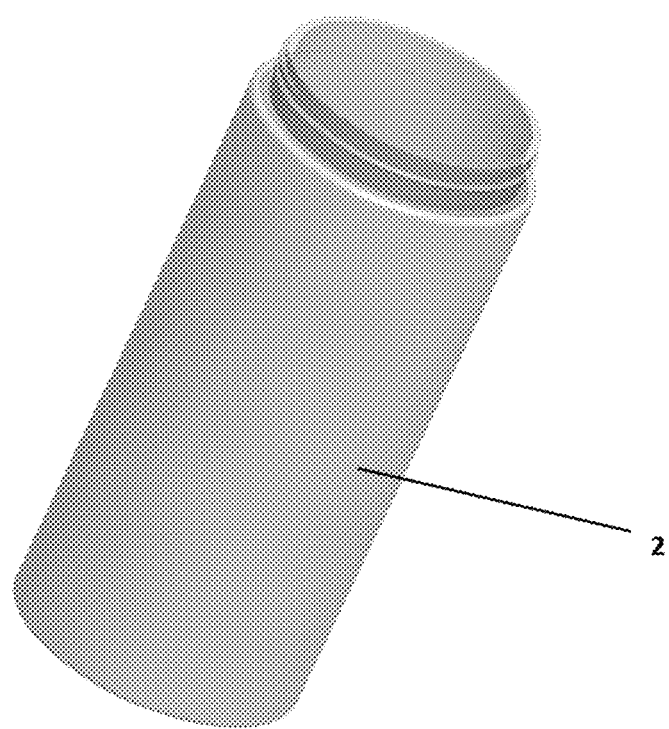
FIG. 2B shows an exemplary container according to the invention.
Figure 3:
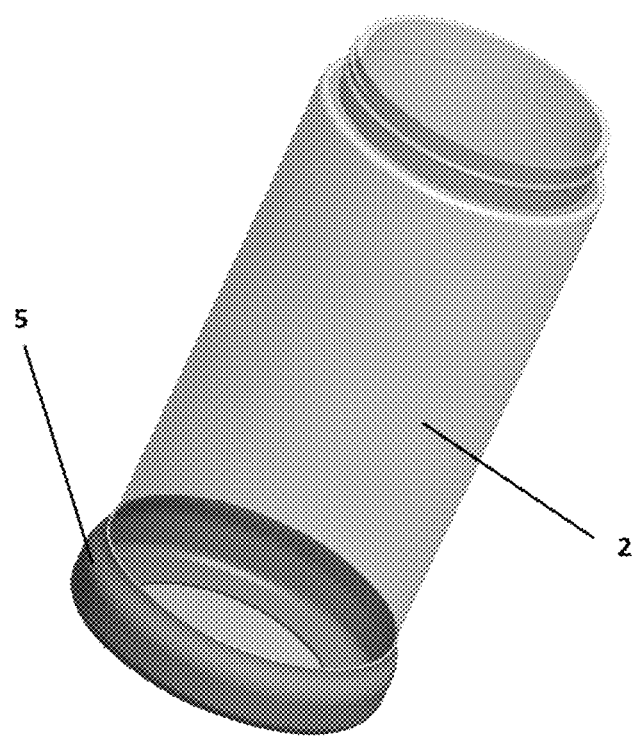
FIG. 3 shows an exemplary container according to the invention, having a base attached thereto.
Figure 4:
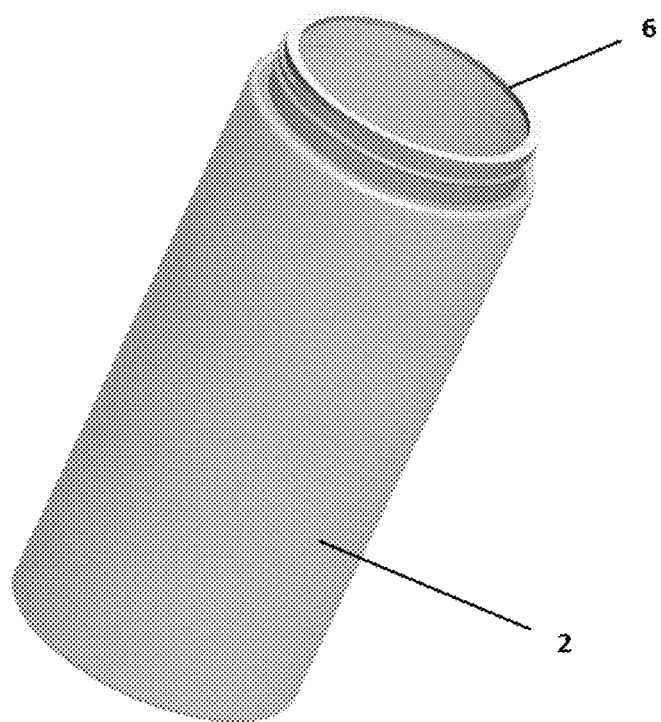
FIG. 4 shows an exemplary container according to the invention, having a gasket.

As shown in FIGS. 2A and B, the container 2 has an open top, a closed sidewall, and a closed bottom, so that it can hold the liquid that will be infused with essence of infusion material held in the filter basket 4. The container 2 is preferably transparent to allow viewing the liquid in the container 2 as infusion progresses, but can be opaque or translucent in its entirety or in sections. As shown in FIG. 3, a base 5, such as a ring made of silicone or other material, can be removably attached at the closed bottom to support the container 2 when placed on a surface such as a counter or table. The container 2, near the open top, can have threads or other surface structure to assist in coupling to the container collar 3. A gasket 6 can also be placed at the top edge of the container 2 to provide a secure seal with the container collar 3, as shown in FIG. 4. The exemplary container 2 shown in the drawings is generally cylindrical in shape, but the cross-section of the container 2 can be any regular or irregular shape, and can have a decorative exterior.

Figure 5:
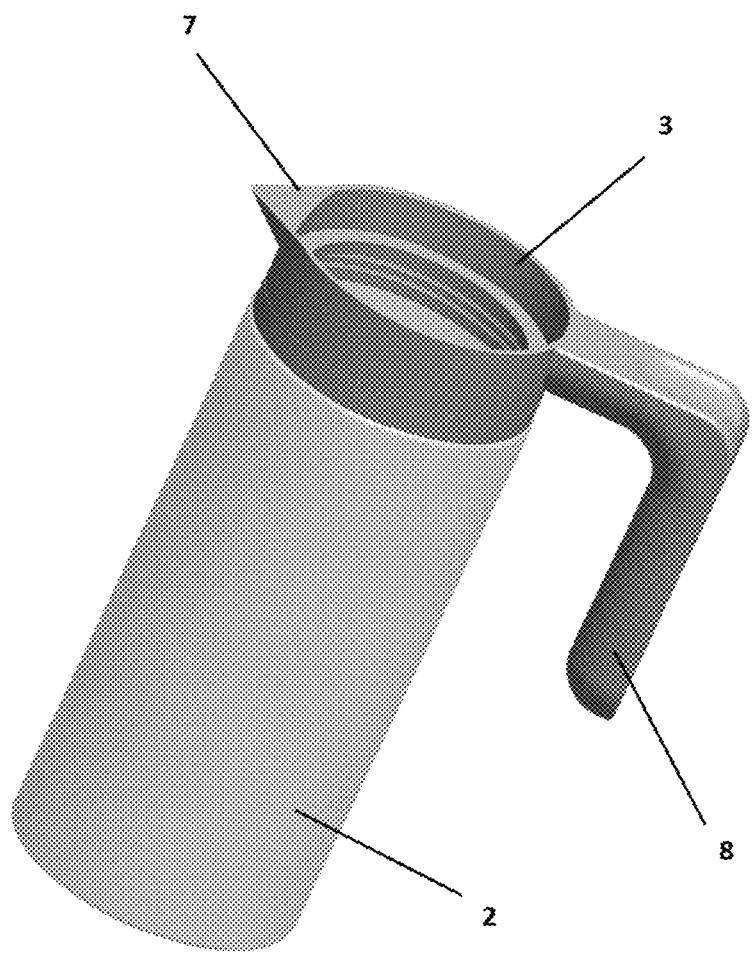
FIG. 5 shows an exemplary container according to the invention, having a container collar coupled thereto.
Figure 6A:
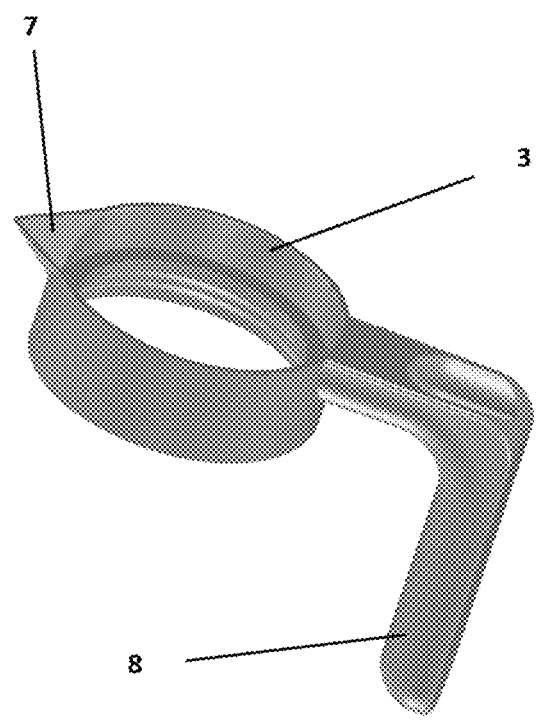
FIG. 6A shows an exemplary container collar according to the invention.
Figure 6B:
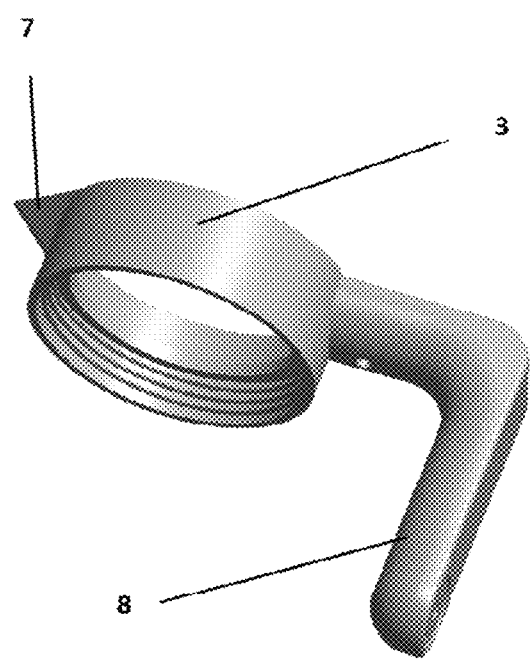
FIG. 6B shows an exemplary container collar according to the invention.

The container collar 3 has a collar opening to accommodate insertion of the filter basket 4 and is configured to couple to the rim of the open top of the container 2, as shown in FIG. 5. As shown in FIGS. 6A and B, the container collar 3 preferably has a pour spout 7 and a handle 8. The container collar 3 can also have internal threads corresponding to the threads at the top portion of the container 2, configured to couple the container collar 3 to the container 2. Other mating components can be used instead of threaded coupling components, such as snap-fit or friction fit elements, or any other mating scheme apparent to those of skill in the art.

Figure 7A:
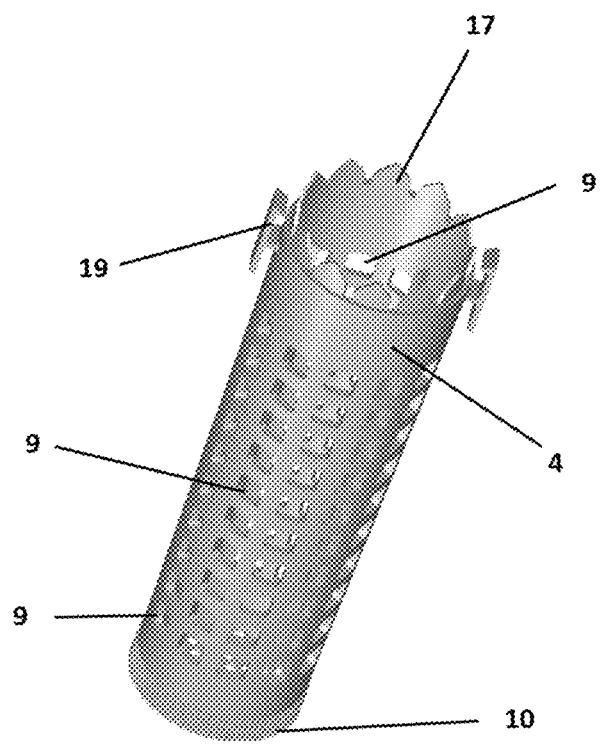
FIG. 7A shows an exemplary filter basket according to the invention.
Figure 7B:
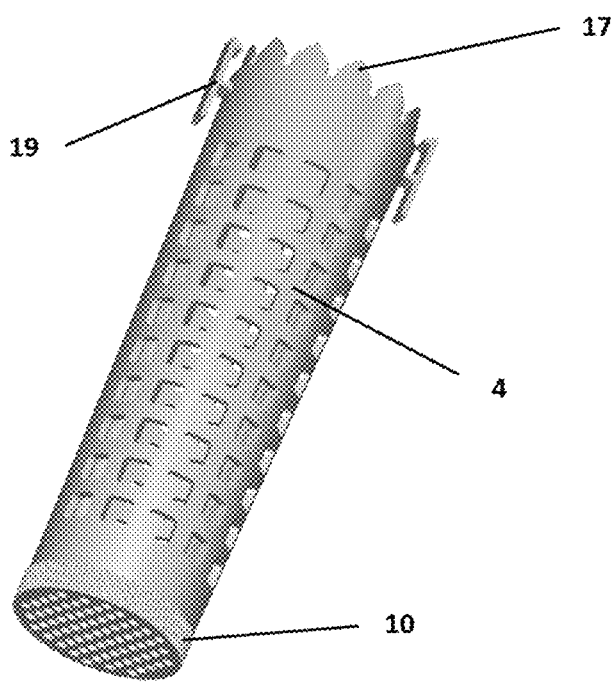
FIG. 7B shows an exemplary filter basket according to the invention.

Referring to FIGS. 7A and B, the filter basket 4 is configured to hold infusion material and to be suspended into an interior of the container 2. For example, the filter basket 4 can hold fruit or other infusion material that will be suspended in liquid within the container 2 (FIG. 7D), allowing liquid to pass through the infusion material in order to infuse the material into the liquid. As shown, the filter basket 4 includes an open top, a bottom, and a sidewall having at least one opening, and preferably several openings 9.

Figure 7C:
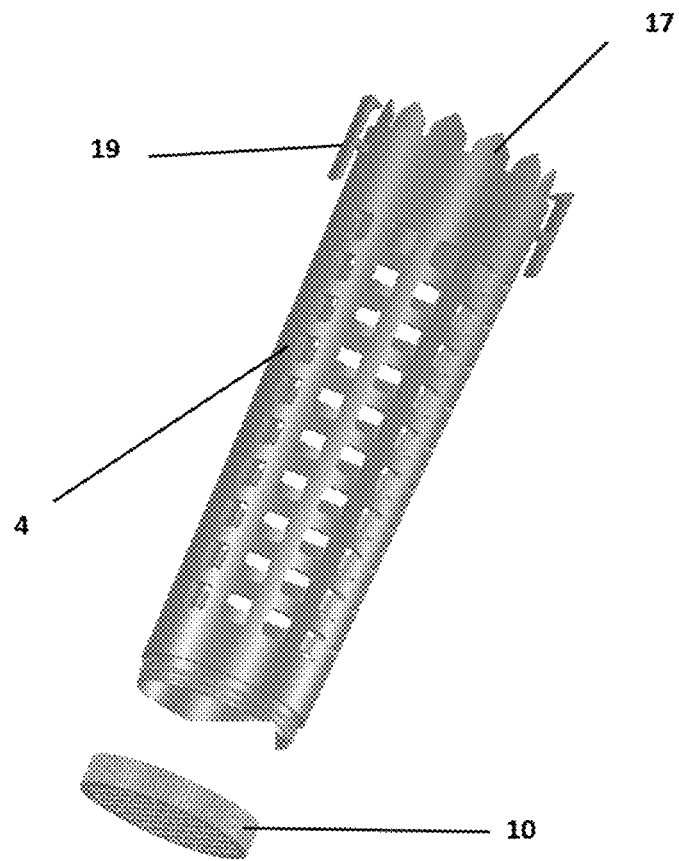
FIG. 7C shows an exemplary filter basket according to the invention.
Figure 7D:
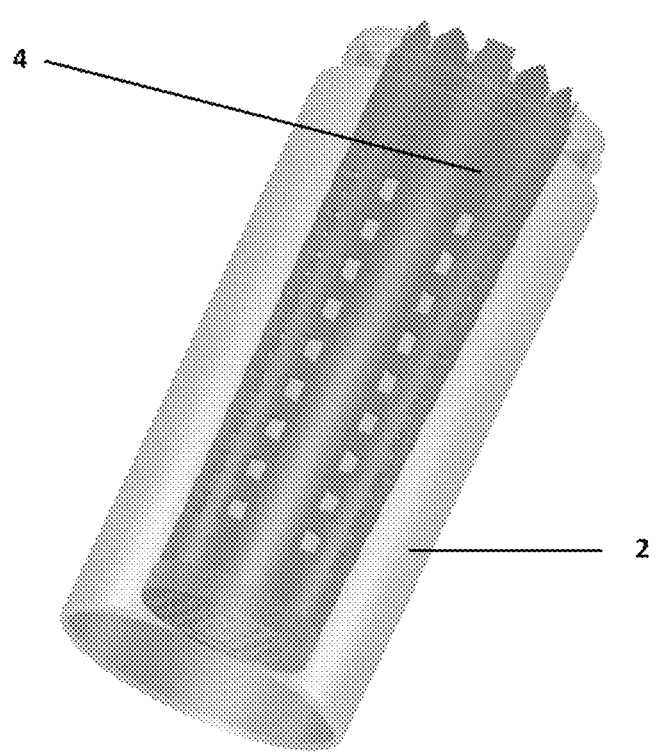
FIG. 7D shows an exemplary filter basket within an exemplary container according to the invention.

The bottom 10 of the filter basket 4 can have a closed surface or, as shown, the bottom 10 of the filter basket 4 can have a surface including an aperture or a number of holes to allow liquid to pass through during the infusion process, or can have an opening that is covered in a mesh material. The filter basket 4 can be formed as an integrated unit, from a single piece of plastic, metal, or other suitable material. Alternatively, as shown in FIG. 7C, the bottom 10 of the filter basket 4 can be a bottom cap configured to be removably coupled to a bottom of the sidewall of the filter basket 4. The bottom cap can screw onto threads on the sidewall, or can snap-fit, friction-fit, or otherwise mate with the bottom end of the sidewall. The circumferential edge of the bottom cap can have a texture, such as raised ribs, to assist in gripping the bottom cap for placement or removal.

The filter basket sidewall can be a solid surface, with one or more openings 9 cut from the solid sidewall. Alternatively, for example, the sidewall can be a frame made of frame elements that connect and leave openings 9 between the elements. To further influence movement of the liquid and infusion material within the filter basket 4 during the infusion process, the filter basket 4 can include implements within and on the outside of the sidewall to direct fluid flow and/or to increase turbulence.

As shown, the filter basket 4 sidewall can have a circular cross-section and can include a frame having longitudinal members and connecting circumferential members, forming a lattice or grid structure, but any configuration that is sturdy and also includes one or more open areas 9 to allow liquid to pass through is suitable for use as the frame. The open areas 9 should be large enough to allow liquid to pass through freely, but small enough to retain the intended infusion material within the filter basket 4. Regardless of the shape or arrangement of the structural pieces of the sidewall, the structure defines the sidewall openings 9 through which liquid will pass.

Figure 7E:
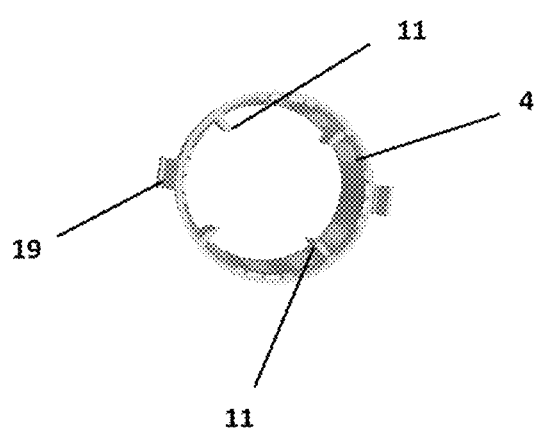
FIG. 7E shows an interior view of an exemplary filter basket according to the invention.

As shown in FIG. 7E, the filter basket 4 can include one or more blades 11 or paddles projecting inward from an inner surface of the sidewall within the interior of the filter basket 4. These blades 11 can help increase turbulence of the liquid in the filter basket 4 when the filter basket is rotated or otherwise agitated. Increased turbulence of the liquid can help speed the infusion process. The blades 11 shown in the drawing are just examples of blades that can be used in the filter basket 4, and blades of other sizes and shapes, protruding from the sidewall at other angles, can be utilized advantageously according to the invention.

Other features can be included to provide further agitation or turbulence as the filter basket 4 rotates. For example, fins can be integrally formed on or attached to the bottom of the filter basket 4, extending downward and/or outward to provide mixing to the water in the container 2 as infusion progresses. Similar fins can be included elsewhere on the outside of the filter basket 4 instead of or in addition to the bottom fins. Blades such as those described above can also be added to the exterior of the filter basket 4 sidewall.

Figure 7F:
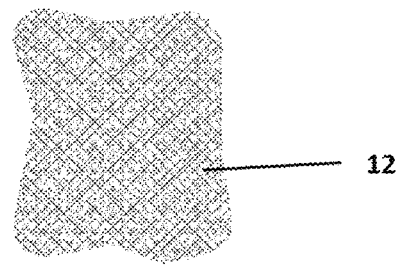
FIG. 7F shows exemplary mesh material according to the invention.
Figure 7F:
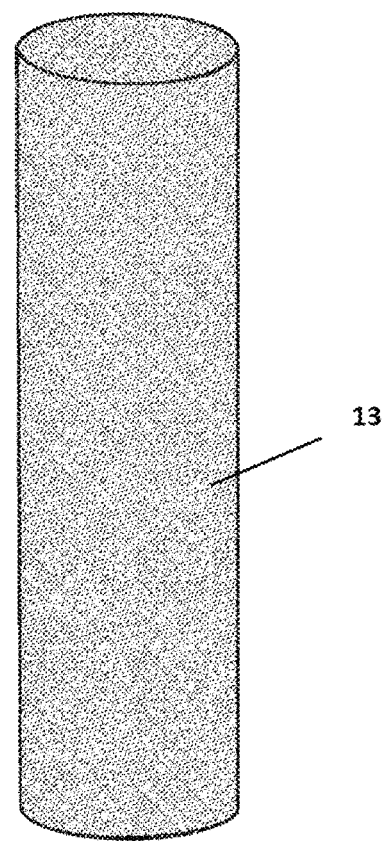

The filter basket 4 shown can be used when the infusion material is fruit or other material that is too large to pass through the openings 9 in the sidewall. However, for example, in order to infuse an herbal drink or tonic, or to cold-brew coffee or tea, more finely ground or crushed infusion material might be used. In these cases, a mesh material 12 can be used to cover the openings in the sidewall, or a mesh insert 13 can be placed in the filter basket 4 to cover the openings. See FIG. 7F.

An optional mesh element can cover each opening 9 in the sidewall of the filter basket 4. The number, locations, and sizes of the openings 9 can be selected for advantageous flow of infusion liquid through the sidewall and therefore through the infusion material held in the filter basket 4. A single mesh-covered opening can be used, or several strategically-placed mesh-covered openings can be present to direct liquid flow through and within the filter basket 4. The sizes of the openings 9 can be uniform or varied, as can the material and mesh size of the mesh elements. Alternatively, a single mesh tube 13 can be inserted into the filter basket 4 and attached to the inner surface of the filter basket 4, of a size large enough to cover the opening or all the multiple openings 9, or the mesh tube 13 can wrap the outside surface of the filter basket 4. Regardless of the form of the one or more mesh elements, each can be constructed from any material that can withstand the fluid dynamics of the liquid infusion device 1 in operation.

If the mesh insert 13 is used, it can be inserted and removed as necessary, depending on the infusion material used. Examples of suitable mesh materials are fine nylon mesh (for example nylon mesh of 75 micron opening or other suitable size), metal mesh material, and paper mesh material or filter paper. Those skilled in the art will recognize that other mesh material of suitable size and material may be used, and any such other mesh material is contemplated for use within the scope of the invention.

Figure 8A:
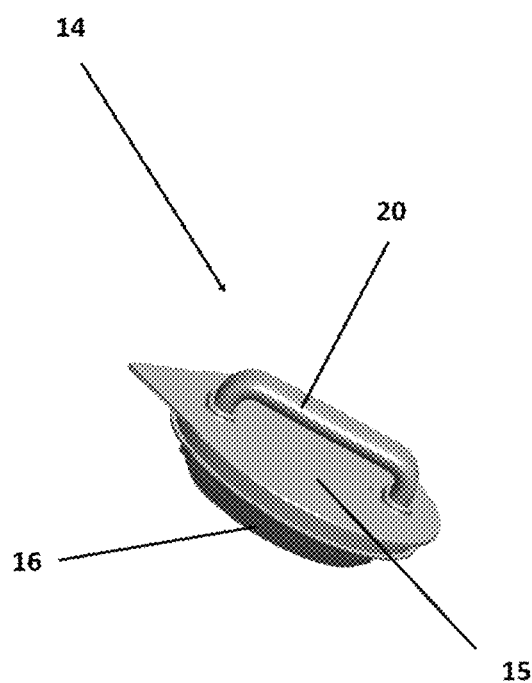
FIG. 8A shows an exemplary pouring lid assembly according to the invention.
Figure 8B:
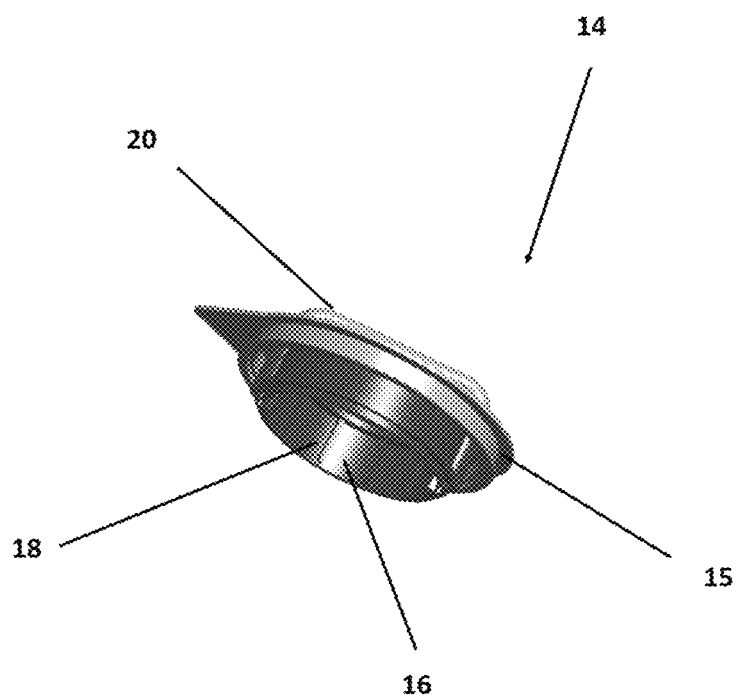
FIG. 8B shows an exemplary pouring lid assembly according to the invention.
Figure 8C:
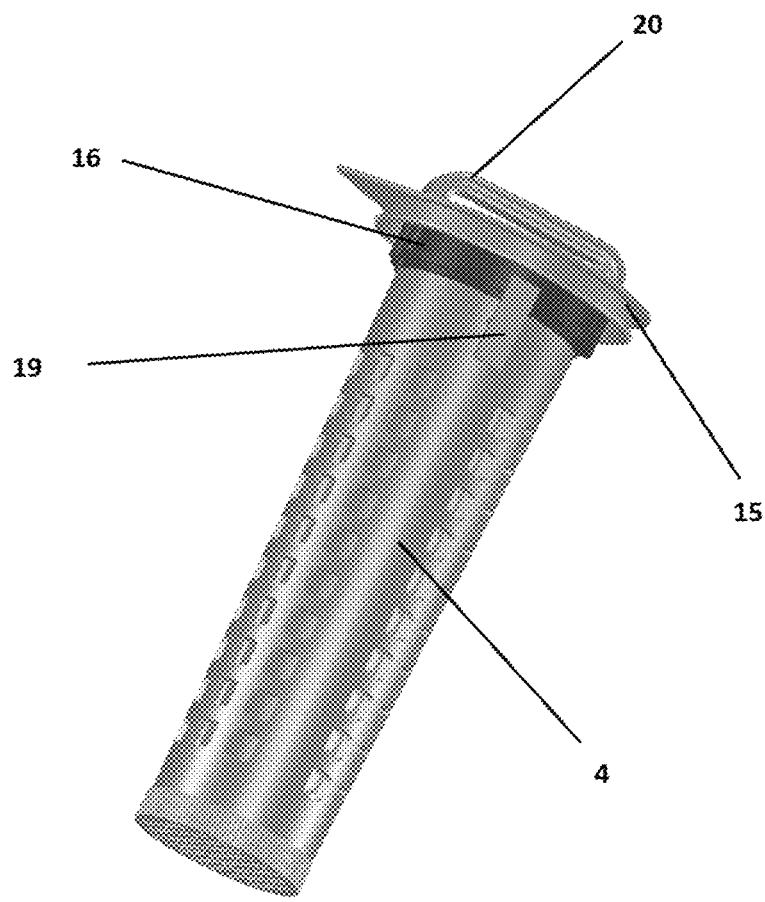
FIG. 8C shows an exemplary pouring lid assembly according to the invention, coupled to a filter basket assembly.
Figure 8D:
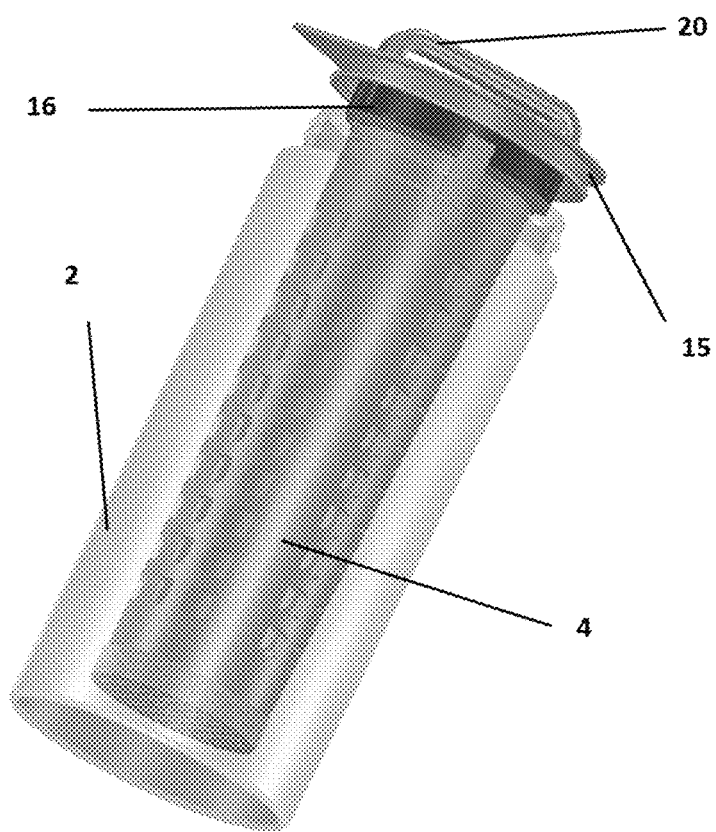
FIG. 8D shows an exemplary pouring lid assembly according to the invention, coupled to a filter basket assembly within a container.
Figure 8E:
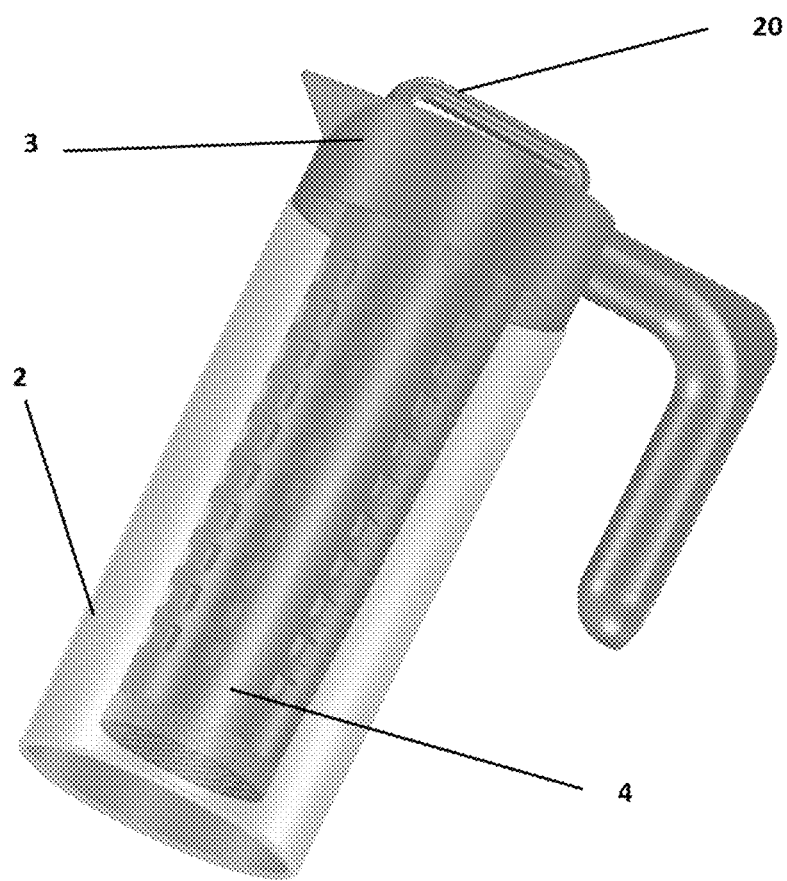
FIG. 8E shows an exemplary pouring lid assembly according to the invention, coupled to a filter basket assembly and a container collar above a container.
Figure 8F:
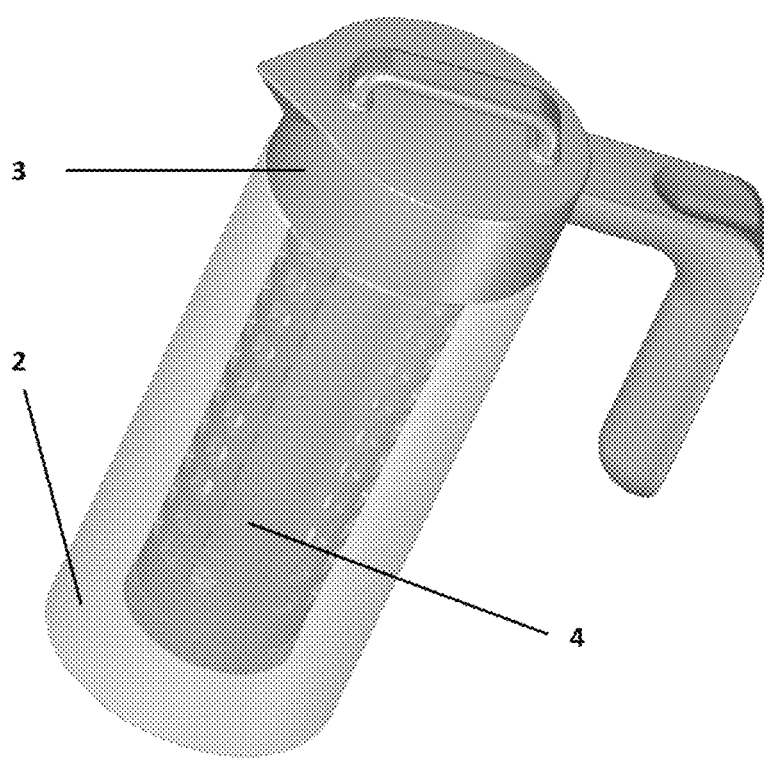
FIG. 8F shows an exemplary pouring lid assembly according to the invention, coupled to a filter basket assembly and a container collar above a container.

In order to facilitate suspension of the filter basket 4 in the container 2, the liquid infusion device 1 can also include a lid assembly, configured to cover at least a portion of the collar 3 opening and providing a mechanism for coupling the filter basket 4. For example, the lid assembly can be a pouring lid assembly 14, which can include a pouring lid 15 and a filter basket connector 16, as shown in FIGS. 8A and B. The pouring lid 15 can be configured to cover at least a portion of the collar 3 opening when placed on the container collar 3. The filter basket connector 16 can be coupled or attached to the pouring lid 15 and configured to couple to the open top of the filter basket 4, as shown in FIG. 8C, so that the filter basket 4 can be suspended from the pouring lid assembly 14 into the container 2, as shown in FIGS. 8D-F.

To mechanically couple the filter basket connector 16 to the filter basket 4, the filter basket 4 can include first cooperative elements 17, and the filter basket connector 16 can include second cooperative elements 18 configured to align and engage the first cooperative elements 17. For example, the first cooperative elements 17 can include projections, and the second cooperative elements 18 can include corresponding spaced bars configured to align and engage the projections to mechanically couple the filter basket connector 16 to the filter basket 4. The projections can be, for example, generally triangular in shape, although the projections can take any shape. The filter basket 4 can include basket clips 19 arranged on an outside surface of the filter basket 4 sidewall and configured to removably couple to the filter basket connector 16.

The pouring lid assembly 14 can also include a handle 20 coupled to the pouring lid 15 opposite the filter basket connector 16, to facilitate placement and removal of the pouring lid assembly 14. The pouring lid 15 can also have a central through-opening, configured such that the open top of the filter basket 4 opens into the collar opening through the central through-opening when the filter basket connector 16 is coupled to the open top of the filter basket 4. This central through-opening allows placement of the infusion material in the filter basket 4 after the filter basket 4 has been suspended in the liquid in the container 2, if desired. That is, hot or cold liquid can be added to the container 2 before putting the filter basket 4 in place in the container collar 3, or the filter basket 4 can be put in place first, and then hot or cold liquid can be poured into the filter basket 4 and over the infusion material, filling the container 2 through the openings 9 in the filter basket 4.

Figure 9A:
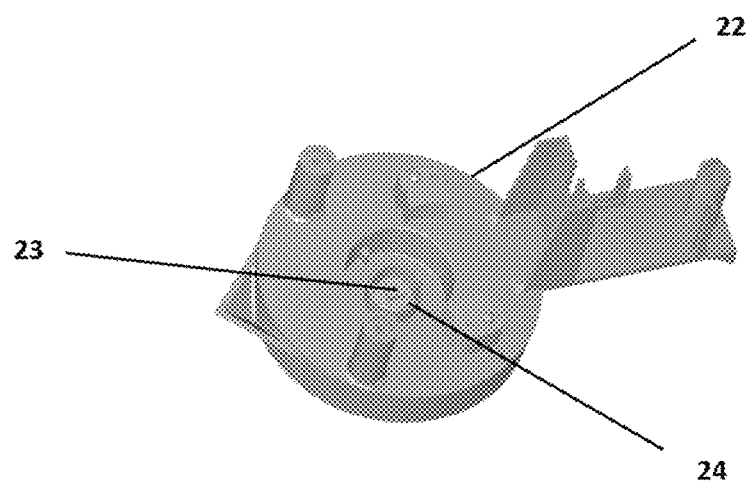
FIG. 9A shows an exemplary chassis assembly and filter coupler according to the invention.
Figure 9B:
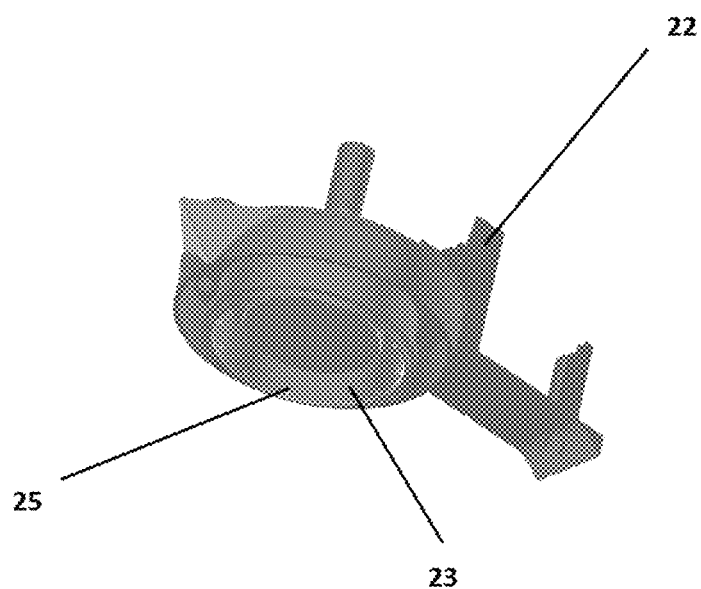
FIG. 9B shows an exemplary chassis assembly and filter coupler according to the invention.

Alternatively, the lid assembly can be an agitator lid assembly 21, which, in addition to providing suspension of the filter basket 4 in the container 2, can also provide agitation or other motion to the filter basket 4, helping to speed the infusion process. As shown in FIGS. 9A and B, the agitator lid assembly 21 can include a chassis assembly 22 and a filter coupler 23. The chassis assembly 22 has a through-hole 24 and is configured to cover at least a portion of the collar opening, similarly to the pouring lid assembly 14. The filter coupler 23 is arranged at an opening in the through-hole 24 of the chassis assembly 22 and is configured to couple to the open top of the filter basket 4 so that the filter basket 4 can be suspended from the agitator lid assembly 21 into the container 2. Similarly to the pouring lid assembly 14, the filter coupler 23 can include second cooperative elements 25 configured to align and engage the first cooperative elements 17 of the filter basket 4, to provide mechanical coupling.

Figure 10A:
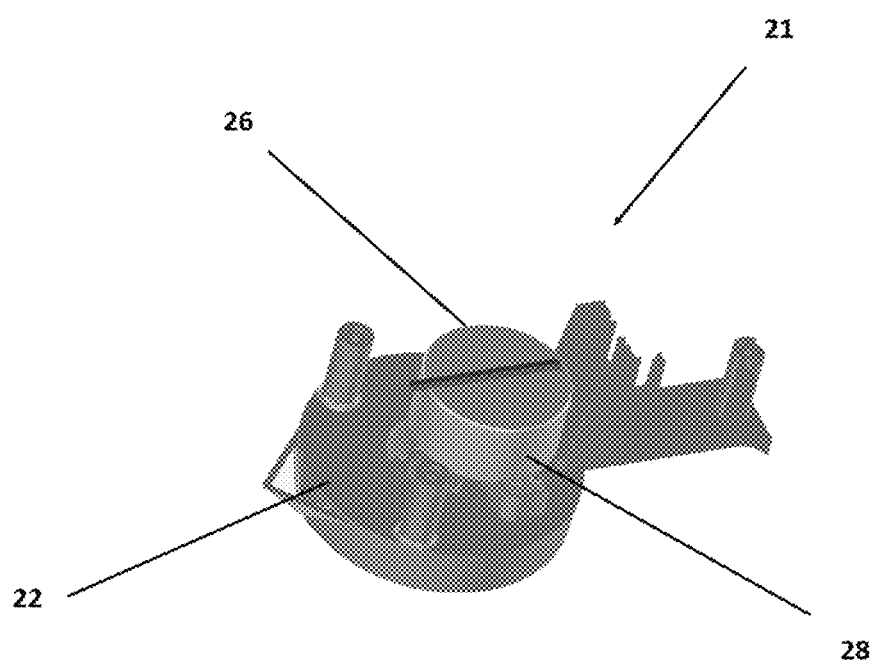
FIG. 10A shows an exemplary motor according to the invention.
Figure 10B:
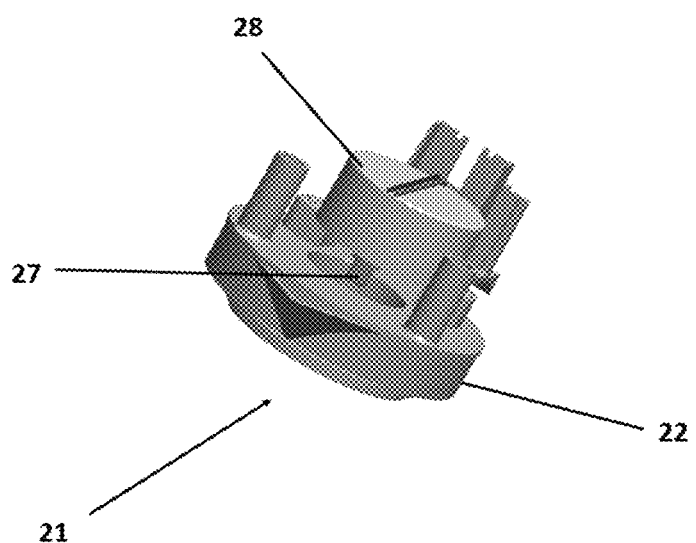
FIG. 10B shows an exemplary drive assembly according to the invention.
Figure 10C:
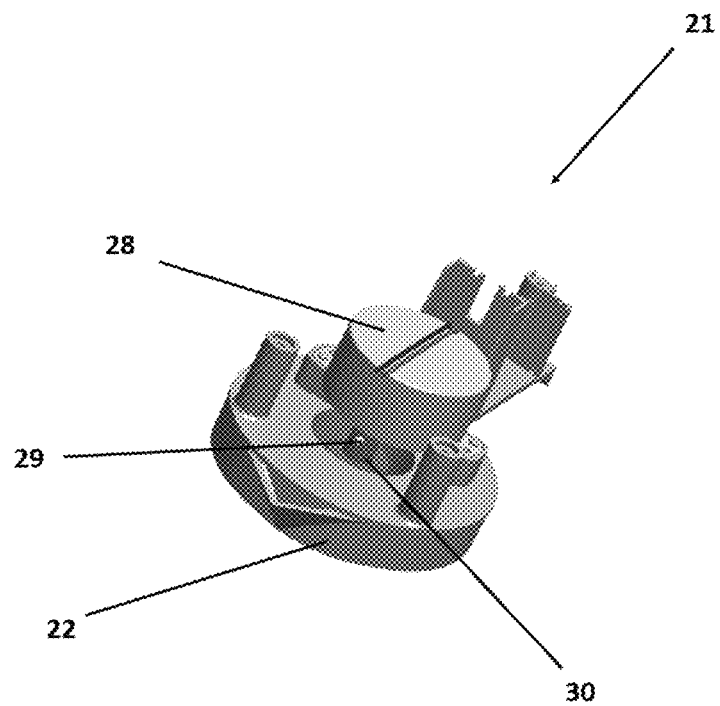
FIG. 10C shows an exemplary motor coupler according to the invention.
Figure 10D:
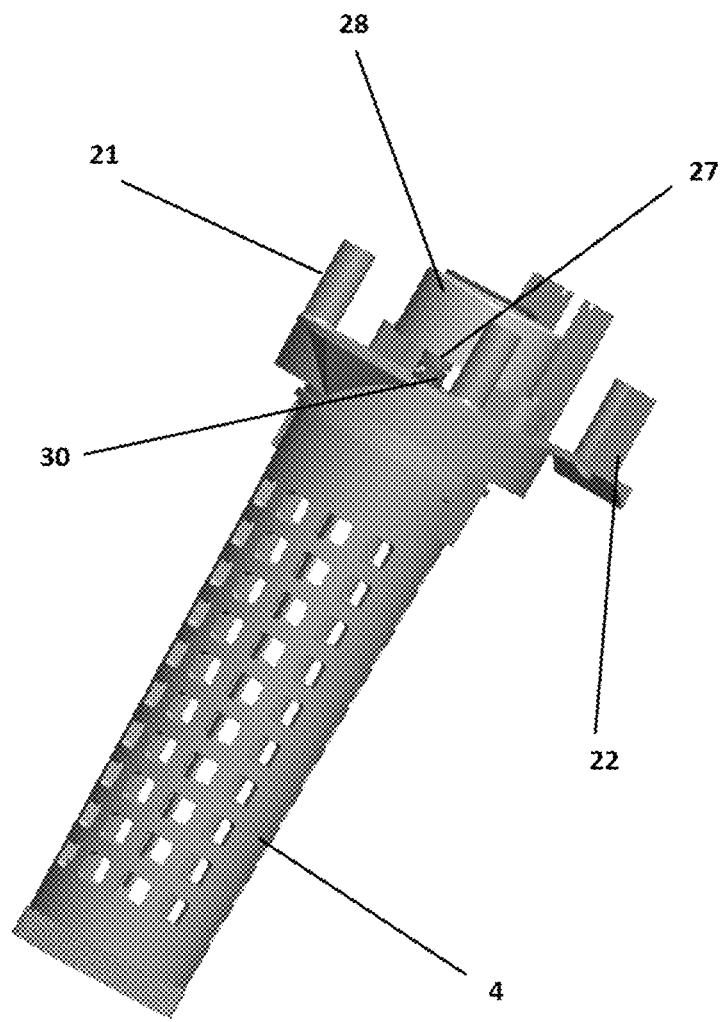
FIG. 10D shows an exemplary chassis assembly coupled to a filter basket according to the invention.

The agitator lid assembly 21 can also include a motor assembly 26 mounted on the chassis assembly 22, as shown in FIGS. 10A and B. The motor assembly 26 can include a drive element 27, and a motor 28 configured to move the drive element 27 when actuated. Referring to FIG. 10C, the agitator lid assembly 21 can also include a motor coupler 30, coupled to the drive element 27 (for example via a roll pin 29) and to the filter coupler 23. As arranged, actuation of the motor 28 causes transfer of the motion of the drive element 27 to the filter coupler 23. For example, the motor 28 can be configured to rotate the drive element 27 such that the filter coupler 23 rotates when the filter basket 4 is coupled to the filter coupler 23 as shown in FIG. 10D.

In general, the motor assembly 26 can be used to rotate the filter basket 4, or provide another mode of motion, in order to provide agitation that can speed an infusion process. The drive element 27 and/or motor coupler 30 can be offset or cammed to provide erratic motion and turbulence. The motor 28 is preferably an electric motor and can be powered by one or more batteries, a hand crank, a solar device, AC power, a spring force, or any other source of energy. Any type of motor providing movement to drive the filter basket 4 can be used, and the motion can be transferred by a belt drive or any other mechanism, which can include reduction gears or other gearing. Of course, a hand crank can be provided in place of the motor assembly 26 to enable agitated infusion without the need for electrical power.

Preferably, the speed and direction of the motion provided by the motor assembly 26 can be adjusted to suit the infusion application. For example, the motor assembly 26 can provide continuous rotation in one direction only, at a constant or varying speed, such as between about 30 and 90 cycles per minute, or the rotational motion can be a reversing oscillation, such as between 90 degrees and 270 degrees. Preferably, the speed, direction, and range are selectable by a user.

Figure 11A:
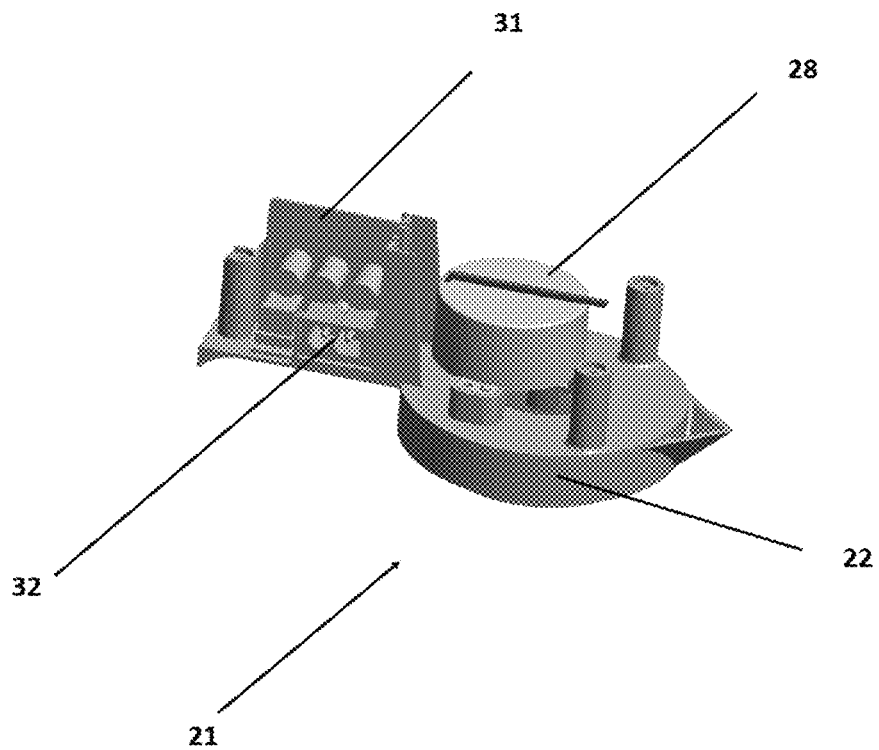
FIG. 11A shows an exemplary power supply assembly according to the invention.
Figure 11B:
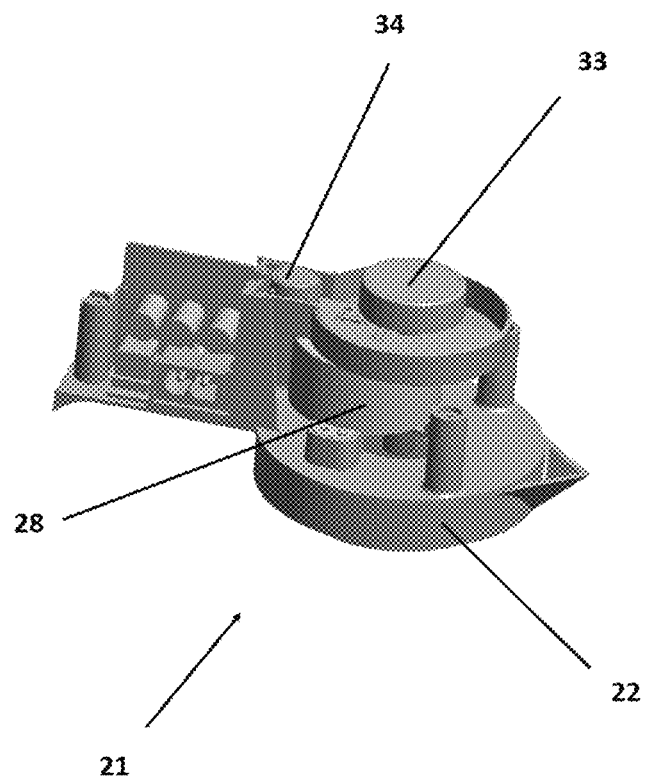
FIG. 11B shows an exemplary control and knob assembly according to the invention.

As shown in FIGS. 11A and B, various other components of the liquid infusion device 1 can be mounted on the chassis assembly 22. For example, a power supply assembly 31, including such components as a PC board, transformer, discrete electrical components (such as a varistor, capacitors, etc.), and an AC socket 32 (configured to accept an AC power cord) can be mounted on the chassis assembly 22, as well as a knob assembly 33, control circuitry, micro rotary switches, LEDs, and any other electrical components necessary to provide operational and control functions, in addition to a brew button and PCB cover. Suitable control circuitry can enable programmable agitation motion to vary the speed and direction automatically according to pre-set parameters. Bluetooth® or other wireless technology can be enabled to allow remote control from a mobile smart device.

Controls for the motor can be made available to the user via a panel or individual buttons or knobs on the top assembly. These controls can include an actuation control to turn the motor 28 on and off, or actuation can be controlled automatically, for example, by pivoting the agitator lid assembly 21 into place above the filter basket 4 and completing an interlock connection. The motor 28 can be simple in function, causing rotation in one direction at a single speed, or the speed can be controllable by the user, in steps or continuously variable. The motor assembly 26 can be configured to rotate the filter basket 4 in either direction, or in both directions in a sequential pattern, such that the filter basket 4 oscillates back and forth. The speed of rotation should be great enough to agitate the infusion material in the liquid within the filter basket 4, so as to speed the infusion process, but not so great as to induce centrifugal force that would push and hold the infusion material against the inner sidewall of the filter basket 4.

Further, the motor assembly 26 need not cause the filter basket 4 to rotate about a static axis. The motor assembly 26 can be coupled to the filter basket 4 on a movable spindle connected to a cam, for example, such that the rotational axis moves within the container 2, laterally and/or at an angle, affecting the fluid dynamics of the infusion process. Alternatively, the motor assembly 26 can be configured to make the filter basket 4 jitter or otherwise move erratically, or to simply move back and forth, laterally or in the motion of a pendulum, or in an eccentric pattern. Any coupling between the motor assembly 26 and filter basket 4 that can be used to achieve the desired motion of the filter basket 4 is contemplated for use with the liquid infusion device 1 of the invention. Likewise, the inner lip of the filter coupler 23, and the upper edge of the filter basket 4, can be shaped to assist in providing the desired motion, such as by being curved radially or circumferentially to provide support for the motion. One or more bearings or other elements can be arranged at the interface between the container collar 3 and the filter basket 4 in order to reduce friction and wear.

Figure 11C:
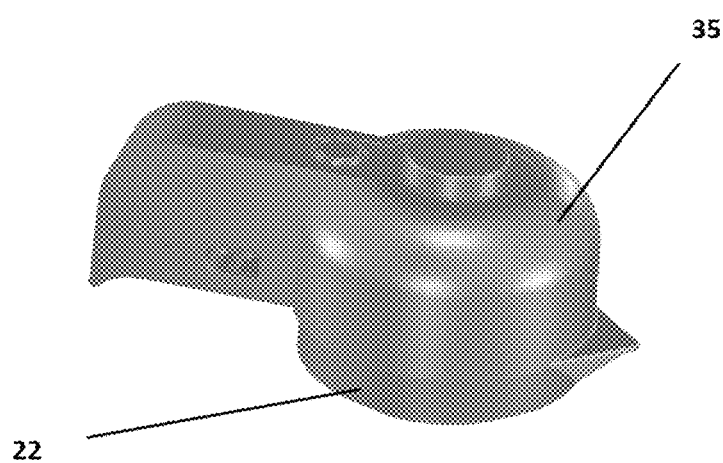
FIG. 11C shows an exemplary motor cover according to the invention.

Referring to FIG. 11C, the agitator lid assembly 21 can also include a motor cover 35, configured to be movably coupled to the chassis assembly 22 to selectively cover and uncover the motor. For example, the motor cover 35 can be completely detachable from the chassis assembly 22 and therefore removable, or it can be connected to the chassis assembly 22 by a hinged connection. The motor cover 35 has openings as necessary for the operation of the liquid infusion device 1, to allow any brew knobs or buttons and switches to be accessible, and any LEDs or displays to be viewable, while the motor cover 35 is in place on the chassis assembly 22.

After infusion has taken place to a sufficient degree, the agitator lid assembly 21 can be replaced by the pouring lid assembly 14, either with or without the filter basket 4 attached to the filter basket connector 16. Attaching the filter basket 4 to the pouring lid assembly 14 allows further infusion to take place while the infused liquid is stored in the container 2.

Thus, the liquid infusion device 1 of the invention can be used to provide an infused liquid such as fruit-infused water, herb-infused oil, coffee, tea, or an herbal tonic, from infusion material such as fruit, ground coffee beans, shredded tea leaves, ground or shredded herbs, root shavings, or any other infusion material from which a liquid can draw flavor, nutrition, or other essence.

When used to prepare an infused liquid, the container 2 is filled with hot or cold liquid, in order to hot- or cold-infuse the liquid. Infusion material is placed in the filter basket 4, in an amount desired for the intended infusion strength. The filter basket 4 is suspended in the liquid in the container 2, supported at an upper end by the container collar 3, and in time the liquid is infused by contact with the infusion material. If rotation or other motion is desired in order to speed the infusion process, a motor assembly 26 can be arranged to couple with the filter basket 4. When the motor assembly 26 is actuated, the filter basket 4 is rotated or otherwise agitated by the motor assembly 26, increasing the flow and/or turbulence of the liquid infusion in order to speed the infusion process. Once the process is finished, the motor assembly 26 can be uncoupled from the filter basket 4 and removed, and the filter basket 4 can be lifted out of the container 2, drained, and removed. The pouring lid assembly 14 can then be coupled to the container collar 3 in place of the motor assembly 26.

In general, the liquid infusion device includes a container, a container collar, a filter basket, and a lid assembly. The container, which serves as the vessel in which the liquid is infused as well as the vessel in which the infused liquid is stored and served, has an open top, a closed sidewall, and a closed bottom. Infusing the liquid in the same container used for storage and serving simplifies the process, cuts down on the counter space needed for infusion, and makes clean-up easier. The container can be made, for example, from a transparent material, such as glass or plastic, so that a strength of the infusion can be observed easily. Lines and markings can be applied to the container or to the filter basket to indicate, for example, volume levels of liquid in the container. Suitable materials can be chosen for the container and other elements of the liquid infusion device to allow for hot or cold infusion, if desired.

The container collar is configured to cover the rim of the open top, providing a surface on which to place either lid assembly, and preferably providing a spout to facilitate pouring of the liquid after infusion, as well as a handle by which to carry the infuser. As shown and described, it provides a stable outer surface and an inner opening through which the filter basket can be lowered into the container and infused liquid can be poured out of the container.

The filter basket is configured to hold infusion material and to be suspended from the lid assembly and into an interior of the container. The filter basket includes a sidewall having one or more openings, an open top, and a bottom. The sidewall can have any cross-sectional shape that allows for rotation or other motion of the filter basket about a point or axis. For example, the cross-section of the sidewall can be circular or polygonal, or can be polygonal for the most part, gradually rounding out toward a circular top. The internal shape of the sidewall can be selected to produce the most advantageous fluid motion within the filter basket, based on the rotational movement, direction, and speed of the holder provided by the motor assembly.

Thus, the liquid infusion device of the invention includes container means for holding liquid, collar means for coupling to a rim of the open top of the container means, covering means for covering at least a portion of the collar opening, and filter basket means for holding infusion material and for being suspended from the covering means and into an interior of the container means. The liquid infusion device as contemplated by the inventor is not limited to any particular disclosed means, and instead encompasses any such means known or unknown to those of skill in the art, as arranged and configured in this disclosure.

The present invention has been described by way of example and in terms of preferred embodiments. However, the present invention as contemplated by the inventor is not strictly limited to the particularly disclosed embodiments. To the contrary, various modifications, as well as similar arrangements, are included within the spirit and scope of the present invention. The scope of the appended claims, therefore, should be accorded the broadest reasonable interpretation so as to encompass all such modifications and similar arrangements.

I claim:

1. A liquid infusion device, comprising:
a container having an open top, a closed sidewall, and a closed bottom, configured to hold liquid;
a container collar having a collar opening and configured to couple to a rim of the open top;
a filter basket configured to hold infusion material and to be suspended into an interior of the container, wherein the filter basket includes an open top, a bottom, and a sidewall having at least one opening of a size sufficient to allow passage of liquid; and
an agitation mechanism at least partially arranged outside the container and configured to impart motion to liquid held within the container;
wherein the filter basket is configured to be suspended into the interior of the container such that the open top of the filter basket opens into the open top of the container; and
wherein the filter basket sidewall has a circular cross-section and includes a frame having longitudinal members and connecting circumferential members defining the sidewall opening and a plurality of additional sidewall openings.

2. The liquid infusion device of claim 1, wherein the lid assembly further includes a filter basket connector, coupled to the lid assembly and configured to couple to the open top of the filter basket.

3. The liquid infusion device of claim 1, wherein the collar further includes a pouring spout, and a handle opposite the pouring spout.

4. The liquid infusion device of claim 2, wherein the lid has a through-opening, configured such that the open top of the filter basket opens into the collar opening through the through-opening when the filter basket connector is coupled to the open top of the filter basket.

5. The liquid infusion device of claim 2, wherein the filter basket includes basket clips arranged on an outside surface of the filter basket sidewall and configured to removably couple to the filter basket connector.

6. The liquid infusion device of claim 1, wherein the container collar includes a handle.

7. The liquid infusion device of claim 1, wherein the bottom of the filter basket has a closed surface.

8. The liquid infusion device of claim 1, wherein the bottom of the filter basket has a surface including an aperture.

9. The liquid infusion device of claim 1, wherein the bottom of the filter basket is a bottom cap configured to be removably coupled to a bottom of the sidewall of the filter basket.

10. The liquid infusion device of claim 1, wherein the filter basket includes a mesh element covering the opening in the sidewall of the filter basket.

11. The liquid infusion device of claim 1, further comprising a lid assembly, wherein:
the lid assembly includes the agitation mechanism, and a lid configured to cover at least a portion of the collar opening; and
the filter basket is configured to be suspended from the lid assembly.

12. The liquid infusion device of claim 1, wherein the agitation mechanism is configured to impart motion to liquid within the filter basket.

13. The liquid infusion device of claim 1, wherein the agitation mechanism is configured to impart motion to the filter basket.

14. A liquid infusion device, comprising:
a container having an open top, a closed sidewall, and a closed bottom, configured to hold liquid;
a container collar having a collar opening and configured to couple to a rim of the open top;
a filter basket configured to hold infusion material and to be suspended into an interior of the container, wherein the filter basket includes an open top, a bottom, and a sidewall having at least one opening of a size sufficient to allow passage of liquid; and
an agitation mechanism at least partially arranged outside the container and configured to impart motion to liquid held within the container;
wherein the filter basket is configured to be suspended into the interior of the container such that the open top of the filter basket opens into the open top of the container;
wherein the agitation mechanism is configured to be arranged on the container collar; and
wherein the filter basket is configured to be suspended from the agitation mechanism.

15. The liquid infusion device of claim 14, wherein the agitation means for imparting motion to liquid held in the container means is agitation means for imparting motion to liquid held in the filter basket means.

16. The liquid infusion device of claim 14, wherein the agitation means for imparting motion to liquid held in the container means is agitation means for imparting motion to the filter basket means.

17. The liquid infusion device of claim 14, wherein the lid assembly further includes a filter basket connector, coupled to the lid assembly and configured to couple to the open top of the filter basket.

18. The liquid infusion device of claim 17, wherein the lid has a through-opening, configured such that the open top of the filter basket opens into the collar opening through the through-opening when the filter basket connector is coupled to the open top of the filter basket.

19. The liquid infusion device of claim 14, wherein the container collar includes a handle.

20. The liquid infusion device of claim 14, wherein the bottom of the filter basket has a closed surface.

21. The liquid infusion device of claim 14, wherein the bottom of the filter basket has a surface including an aperture.

22. The liquid infusion device of claim 14, wherein the bottom of the filter basket is a bottom cap configured to be removably coupled to a bottom of the sidewall of the filter basket.

23. The liquid infusion device of claim 14, wherein the filter basket includes a mesh element covering the opening in the sidewall of the filter basket.

24. The liquid infusion device of claim 14, wherein the agitation mechanism is configured to impart motion to liquid within the filter basket.

25. The liquid infusion device of claim 14, wherein the agitation mechanism is configured to impart motion to the filter basket.

26. A liquid infusion device, comprising:
a container having an open top, a closed sidewall, and a closed bottom;
a container collar having a collar opening and configured to couple to a rim of the open top;
a lid assembly configured to cover at least a portion of the collar opening; and
a filter basket configured to hold infusion material and to be suspended from the lid assembly and into an interior of the container, wherein the filter basket includes an open top, a bottom, and a sidewall having an opening;

wherein the lid assembly is an agitator lid assembly, wherein the agitator lid assembly includes:

a chassis assembly having a through-hole and configured to cover at least a portion of the collar opening; and a filter coupler, arranged at an opening in the through-hole of the chassis assembly and configured to couple to the open top of the filter basket;

wherein the agitator lid assembly further includes a motor assembly mounted on the chassis assembly, wherein the motor assembly includes:

a drive element, and a motor configured to selectively impart motion to the drive element.

27. The liquid infusion device of claim 26, wherein the agitator lid assembly further includes a motor coupler, coupled to the drive element and to the filter coupler, configured to transfer motion of the drive element to the filter coupler.

28. The liquid infusion device of claim 27, wherein the motor is configured to rotate the drive element such that the filter coupler rotates.

29. The liquid infusion device of claim 27, wherein the agitator lid assembly further includes a motor cover, configured to be movably coupled to the chassis assembly to selectively cover and uncover the motor.

30. The liquid infusion device of claim 26, wherein the filter basket includes basket clips arranged on an outside surface of the filter basket sidewall and configured to removably couple to the filter coupler.

31. A liquid infusion device, comprising:

a container having an open top, a closed sidewall, and a closed bottom;

a container collar having a collar opening and configured to couple to a rim of the open top;

a lid assembly configured to cover at least a portion of the collar opening; and a filter basket configured to hold infusion material and to be suspended from the lid assembly and into an interior of the container, wherein the filter basket includes an open top, a bottom, and a sidewall having an opening;

wherein the filter basket includes a blade projecting inward from an inner surface of the sidewall within an interior of the filter basket.

\* \* \* \* \*